(12) United States Patent
Bull et al.

(10) Patent No.: US 11,004,422 B1
(45) Date of Patent: May 11, 2021

(54) SYSTEM AND METHOD OF UTILIZING WORKSPACE CONFIGURATIONS

(71) Applicant: Dell Products L.P., Round Rock, TX (US)

(72) Inventors: Spencer G. Bull, Cedar Park, TX (US); Mark R. Ligameri, Santa Rosa, FL (US); Tyler Ryan Cox, Austin, TX (US); Vivek Viswanathan Iyer, Austin, TX (US); Michael S. Gatson, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/774,417

(22) Filed: Jan. 28, 2020

(51) Int. Cl.
```
G09G 5/14      (2006.01)
G06F 16/957    (2019.01)
G06F 3/147     (2006.01)
H04N 5/343     (2011.01)
G09G 5/00      (2006.01)
```
(Continued)

(52) U.S. Cl.
CPC .............. *G09G 5/006* (2013.01); *G06F 3/014* (2013.01); *G06F 3/0481* (2013.01); *G06F 3/147* (2013.01); *G06F 16/9577* (2019.01); *G09G 5/14* (2013.01); *H04N 5/343* (2013.01); *G09G 2340/0407* (2013.01); *G09G 2370/047* (2013.01)

(58) Field of Classification Search
None
See application file for complete search history.

(56) References Cited

U.S. PATENT DOCUMENTS

| | | | |
|---|---|---|---|
| 8,645,390 B1 * | 2/2014 | Oztekin | G06F 16/9535 707/748 |
| 2003/0048275 A1 * | 3/2003 | Ciolac | G09G 5/14 345/544 |

(Continued)

OTHER PUBLICATIONS

How to use GetWindowRect, Retrieved from url: https://stackoverflow.com/questions/18291790/how-to-use-getwindowrect, Retrieved on Apr. 30, 2020; 6 pages.

(Continued)

*Primary Examiner* — Joni Hsu
(74) *Attorney, Agent, or Firm* — Baker Botts L.L.P.

(57) ABSTRACT

In one or more embodiments, one or more systems, methods, and/or processes may: determine if the user is utilizing a previously utilized a workspace configuration; if the user is utilizing the previously utilized workspace configuration, display multiple windows respectively associated with multiple applications; and if the user is not utilizing the previously utilized workspace configuration: determine hardware resources of a current workspace configuration; modify the workspace configuration data based at least on the hardware resources of the current workspace configuration; map the multiple windows respectively associated with the multiple applications to multiple displays of the current workspace configuration based at least on the workspace configuration data; adjust a resolution of a window of the multiple windows based at least on a resolution of a display of the multiple displays that shall display the window; and translate a saved position of the window to a position associated with the display.

14 Claims, 10 Drawing Sheets

(51) Int. Cl.
  *G06F 3/01*   (2006.01)
  *G06F 3/0481*   (2013.01)

(56) References Cited

U.S. PATENT DOCUMENTS

| | | | | |
|---|---|---|---|---|
| 2007/0294630 | A1* | 12/2007 | Duncan | G06F 3/0481 |
| | | | | 715/764 |
| 2008/0049114 | A1* | 2/2008 | Park | H04N 5/232 |
| | | | | 348/222.1 |
| 2008/0141122 | A1* | 6/2008 | Niwa | G06F 40/166 |
| | | | | 715/255 |
| 2015/0339172 | A1* | 11/2015 | Jung | G06F 9/485 |
| | | | | 718/104 |
| 2018/0181252 | A1* | 6/2018 | Park | G06F 3/1446 |
| 2019/0243883 | A1* | 8/2019 | Vangen | G06F 16/9577 |

OTHER PUBLICATIONS

How I can get window handle of running programs in Windows; Trtrieved from url: https://stackoverflow.com/questions/25281009/how-i-can-get-window-handle-of-running-progams-in-windows/25281073, Retrieved on Apr. 30, 2020; 4 pages.

EnumWindows function; Retrieved from url: https://docs.micrsosoft.com/en-us/windows/win32/api/winuser/nf-winuser-enumwindows?redirectedfrom=MSDN, Retrieved on Apr. 30, 2020; 3 pages.

How to stop EnumWindows running infinitely win32, Retrieved from url: https://stackoverflow.com/questions/797967/how-to-stop-enumwindows-running-infinitely-win32, Retrieved on Apr. 30, 2020; 8 pages.

GetWindowRect function; Retrieved from url: https://docs.microsoft.com/en-us/windows/win32/api/winuser/nf-winuser-getwindowrect, Dec. 5, 2018; 3 pages.

SetWindowPos function, Retrieved from url: https://docs.microsoft.com/en-us/windows/win32/api/winuser/nf-winuser-setwindowpos, Dec. 5, 2018; 7 pages.

* cited by examiner

SYSTEM AND METHOD OF UTILIZING WORKSPACE CONFIGURATIONS

BACKGROUND

Field of the Disclosure

This disclosure relates generally to utilizing information handling systems and more particularly to utilizing workspace configurations.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, one or more methods, and/or one or more processes may store workspace configuration data, associated with a user, based at least on initial workspace configuration data; may store, via the workspace configuration data, multiple user preferences associated with the user; may collect contextual input information; may time stamp the contextual input information; may store the contextual input information; may train an artificial intelligence model with the contextual input information; may update the workspace configuration data based at least on the artificial intelligence model; may determine if the user is utilizing a previously utilized a workspace configuration; if the user is utilizing the previously utilized workspace configuration, may display multiple windows respectively associated with multiple applications as the multiple windows were displayed via displays of the previously utilized workspace configuration; and if the user is not utilizing the previously utilized workspace configuration: may determine hardware resources of a current workspace configuration; may modify the workspace configuration data associated with the user based at least on the hardware resources of the current workspace configuration; may map the multiple windows respectively associated with the multiple applications to multiple displays of the current workspace configuration based at least on the workspace configuration data; may adjust a resolution of a window of the multiple windows based at least on a resolution of a display of the multiple displays of the current workspace that shall display the window; and may translate a saved position of the window to a position associated with the display.

In one or more embodiments, determining the hardware resources of the current workspace configuration may include receiving Extended Display Identification Data (EDID) that describe capabilities of the display of the multiple displays of the current workspace that shall display the window. For example, the EDID may include one or more of a manufacturer name, a serial number, a product type, a filter type, timings supported by the display, a size of the display, luminance data, and pixel mapping data, among others. In one or more embodiments, adjusting the resolution of the window may be based at least on the size of the display and the pixel mapping data.

In one or more embodiments, the one or more systems, the one or more methods, and/or the one or more processes may further determine that the display is configured to receive user input via a stylus. In one or more embodiments, the one or more systems, the one or more methods, and/or the one or more processes may further determine that the window is associated with an application of the multiple applications that has been associated with the user input via the stylus. In one or more embodiments, mapping the multiple windows respectively associated with the multiple applications to the multiple displays of the current workspace configuration includes mapping the window to the display based at least on the determining that the display is configured to receive the user input via the stylus. In one or more embodiments, determining that the window is associated with the application of the multiple applications that has been associated with the user input via the stylus may include determining that the application has been tagged for utilization with the stylus. In one or more embodiments, the window may be associated with a first aspect ratio. For example, adjusting the resolution of the window of the multiple windows may be further based at least on a second aspect ratio, different from the first aspect ratio, associated with the display.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1:
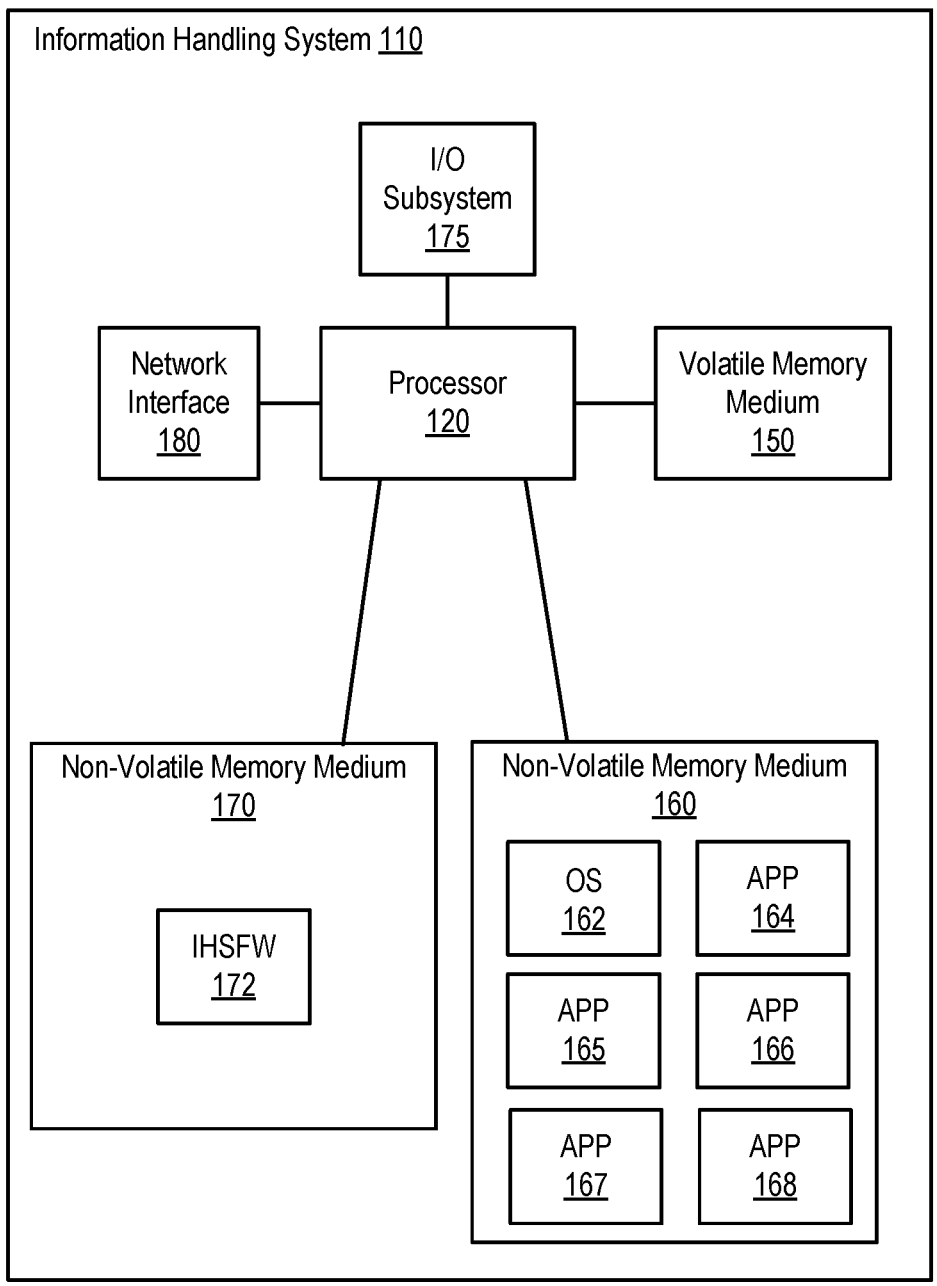
FIG. 1 illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, user productivity may be increased to a state of optimal user productivity. In one or more embodiments, hardware and software may work together to orchestrate a workspace that may minimize an amount of time where user productivity is increased to a state of optimal user productivity. For example, a user may spend time configuring a workspace to increase productivity of the user. For instance, the user may spend the time configuring one or more positions of one or more windows (e.g., one or more windows of one or more applications) at one or more user preferred locations on one or more displays of a workspace configuration. In one or more embodiments, if the user switches or changes from a first context to a second context and/or changes from a first workspace configuration to a second workspace configuration, the user may spend additional time configuring one or more positions of one or more windows at one or more user preferred locations on one or more displays associated with the second context and/or the second workspace configuration. For instance, when the user switches or changes from the first context to the second context and/or changes from the first workspace configuration to the second workspace configuration, the additional time configuring the one or more positions of the one or more windows at the one or more user preferred locations on the one or more displays associated with the second context and/or the second workspace configuration may be a barrier to productivity.

In one or more embodiments, a user may utilize a workspace configuration. For example, a workspace configuration may include multiple windows (e.g., windows of one or more applications) displayed on one or more displays. In one instance, a workspace configuration may include multiple windows displayed on a single display. In another instance, a workspace configuration may include multiple windows displayed on multiple displays. In one or more embodiments, the user may utilize multiple workspace configurations. In one example, the user may utilize a first workspace configuration during a first amount of time transpiring. In another example, the user may utilize a second workspace configuration during a second amount of time transpiring. For instance, the second amount of time transpiring may occur after the first amount of time transpiring.

In one or more embodiments, a workspace configuration may be associated with a system. In one example, a first workspace configuration may include a first information handling system and/or first one or more displays. In a second example, a second workspace configuration may include a second information handling system, different from the first information handling system, and/or second one or more displays, different from the first one or more displays. For instance, at least one of the second one or more displays may be different from at least one of the first one or more displays. In third example, a first workspace configuration may include an information handling system and first one or more displays. In another example, a second workspace configuration may include the information handling system and second one or more displays, different from the first one or more displays. In one instance, at least one of the second one or more displays may be different from at least one of the first one or more displays. In another instance, the information handling system may be a portable information handling system (e.g., a laptop information handling system, a tablet information handling system, etc.).

In one or more embodiments, workspace configuration data may include information associated with one or more executing applications (e.g., one or more applications that are "open") and associated one or more window positions. In one or more embodiments, the workspace configuration data may include information associated with hardware associated with an information handling system. In one example, the hardware associated with the information handling system may include one or more devices associated with the information handling system and/or one or more peripheral devices, among others. In one instance, a device associated with the information handling system may include a processor. In a second instance, a device associated with the information handling system may include a graphics processor unit. In a third instance, a device associated with the information handling system may include a display. In a fourth instance, a device associated with the information handling system may include a touch screen. In a fifth instance, a peripheral device may include a mouse. In a sixth instance, a peripheral device may include a touchpad. In another instance, a peripheral device may include a stylus. In another example, the workspace configuration data may include information associated with one or more device postures. For instance, information associated with a device posture may include an angle of a lid of a portable information handling system with respect to a chassis of the portable information handling system. In one or more embodiments, the lid of the portable information handling system may include a display.

In one or more embodiments, workspace configuration data may be stored. In one example, the workspace configuration data may be stored via an information handling system. For instance, the workspace configuration data may be stored via a non-volatile memory medium of or associated with the information handling system. In another example, the workspace configuration data may be stored via a network. In one instance, the workspace configuration data may be stored via a non-volatile memory medium coupled to the network. In a second instance, the workspace configuration data may be stored via an information handling system coupled to the network. In another instance, the workspace configuration data may be stored via a database system coupled to the network.

In one or more embodiments, workspace configuration data that was previously stored may be retrieved. In one example, the workspace configuration data may be retrieved from an information handling system. For instance, the workspace configuration data may be retrieved from a non-volatile memory medium of or associated with the information handling system. In another example, the workspace configuration data may be retrieved from a network. In one instance, the workspace configuration data may be retrieved from a non-volatile memory medium coupled to the network. In a second instance, the workspace configuration data may be retrieved from an information handling system coupled to the network. In another instance, the workspace configuration data may be retrieved from database system coupled to the network.

In one or more embodiments, workspace configuration data may be based at on a first workspace configuration. For example, the workspace configuration data that is based at least on the first workspace configuration may be stored. In one or more embodiments, the workspace configuration data that is based at least on the first workspace configuration may be retrieved. For example, the workspace configuration data that is based at least on the first workspace configuration may be utilized with a second workspace configuration, different from the first workspace configuration. In one instance, at least one hardware device associated with the second workspace configuration may be different from the first workspace configuration. In a second instance, at least a portion of a hardware device associated with the second workspace configuration may be different from the first workspace configuration. In a third instance, at least one hardware device associated with the second workspace configuration may be in addition to one or more hardware devices associated with the first workspace configuration. In another example, at least one hardware device associated with the first workspace configuration may be in addition to one or more hardware devices associated with the second workspace configuration. In one or more embodiments, the workspace configuration data is based at on the first workspace configuration may be modified for utilization with the second workspace configuration.

In one or more embodiments, a machine learned classification may be based at least on usage patterns from data to classify a user experience utilizing workspace configuration data associated with a workspace configuration. For example, the machine learned classification may infer a bad user experience, a good user experience, a better user experience, or a best user experience of utilizing workspace configuration data associated with a workspace configuration. For instance, the machine learned classification may be utilized to determine at least one most favorable workspace configuration data of multiple sets of workspace configuration data that may be utilized with a workspace configuration.

In one or more embodiments, determining the machine learned classification may include receiving user input. For example, the user input may include a user rating of experience. For instance, the user rating of experience may be a rating of an experience of a user after a workflow has been completed. In one or more embodiments, feature information that may be utilized in determining the machine learned classification may include information associated with workspace configuration data. For instance, the feature information, which may be utilized in determining the machine learned classification, may include one or more of information associated with hardware associated with a workspace configuration, information associated with an application, information associated with one or more positions of the application relative one or more positions of the user, information associated with one or more peripherals utilized by the user, information associated with natural user interaction (NUI) (e.g., a class of inputs including voice, gesture, eye tracking, etc. that may provide a more natural interface between a user and a device), information associated with a number of displays associated with the workspace configuration, information associated with one or more postures of hardware associated with the workspace configuration, information associated with one or more sizes of respective one or more displays associated with the workspace configuration, information associated with one or more screen resolutions of respective one or more displays associated with the workspace configuration, information associated with one or more capabilities of one or more pieces of hardware associated with the workspace configuration, and information associated with one or more physical locations of one or more pieces of hardware associated with the workspace configuration, among others.

In one or more embodiments, as the user utilizes workspace configuration data with a workspace configuration, the user may change the workspace configuration data. For example, the user may change a first position of a window associated with an application to a second position of the window. In one instance, the first position of the window and the second position of the window may be on a single display. In another instance, the first position of the window may be on a first display, and the second position of the window may be on a second display, different from the first display. In one or more embodiments, the machine learned classification may determine a best or a favorable modification of the workspace configuration data based at least on a workspace configuration that the user utilizes or that the user will utilize. In one or more embodiments, the machine learned classification may include a model. For example, the model may include an artificial intelligence model. In one instance, the artificial intelligence model may include a machine learning model. In one instance, the artificial intelligence model may include a neural network model.

In one or more embodiments, the artificial intelligence model may be utilized to create or determine a contextual workspace. For example, the contextual workspace may be created or determined based at least on telemetry collection such as environmental one or more sensor readings, one or more user interactions, and/or one or more derived user intents, among others. In one or more embodiments, a calibration phase and/or a configuration phase may be utilized to machine learn and collect time series data associated with matching window positions associated with a workspace configuration for one or more contexts. For example, a context of the workspace configuration may include indoor location, an outdoor location, and/or other environmental parameters. In one or more embodiments, the user may manually choose the applications that the user would like tracked for one or more learned placements. For example, as a part of calibration, the user may manually choose the applications that the user would like tracked for one or more learned placements.

In one or more embodiments, telemetry input context may be continued to be collected. For example, the telemetry input context may include information associated with an information handling system, information associated with the user, information associated with an environment of the user, and a number of docked displays (e.g., a number of displays coupled to a docking station), among others. In one or more embodiments, the artificial intelligence model may be utilized to determine best workspace configuration data, nearest workspace configuration data, or favorable workspace configuration data for a workspace configuration and/or for a workspace configuration associated a context. For example, the artificial intelligence model may be utilized to match one or more resources available with one or more applications. For instance, the one or more resources available may include one or more pieces of hardware of a workspace configuration. In one or more embodiments, the artificial intelligence model may be utilized to dynamically provide intelligent positioning of software applications based at least on hardware capabilities associated with a workspace configuration for a personalized workspace to optimize productivity of a user.

In one or more embodiments, a translation method or process may be utilized to translate one or more application window settings to a display context. For example, a display context may include one or more attributes associated with a display. For instance, the one or more attributes associated with the display may include one or more of a size of the display, a resolution of the display, and a physical location of the display, among others. In one or more embodiments, translated window positions may be set. For example, setting the translated window positions may include saving changes in application window positions performed by the user after applying a hysteresis method or process.

Turning now to FIG. 1, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, and a network interface 180. As illustrated, volatile memory medium 150, non-volatile memory media 160 and 170, I/O subsystem 175, and network interface 180 may be communicatively coupled to processor 120.

In one or more embodiments, one or more of volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCI-Express (PCIe) root complexes. In another example, one or more of an I/O subsystem 175 and a network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing one or more systems, one or more flowcharts, one or more methods, and/or one or more processes described herein. In one example, processor 120 may execute processor instructions from one or more of memory media 150, 160, and 170 in implementing one or more systems, one or more flowcharts, one or more methods, and/or one or more processes described herein. In another example, processor 120 may execute processor instructions via network interface 180 in implementing one or more systems, one or more flowcharts, one or more methods, and/or one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150, 160, and 170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, processor 120 and one or more components of IHS 110 may be included in a system-on-chip (SoC). For example, the SoC may include processor 120 and a platform controller hub (not specifically illustrated).

Figure 2A:
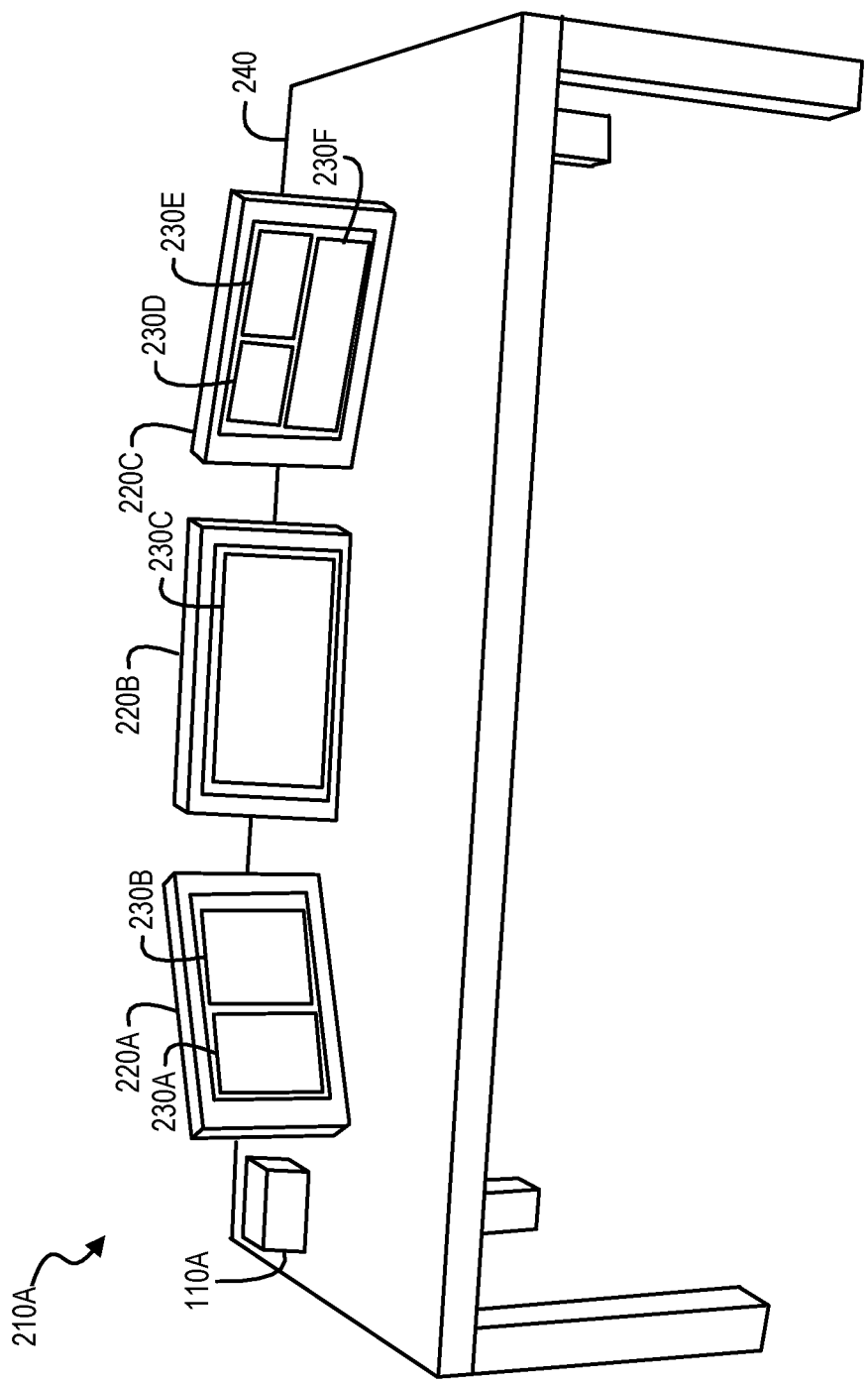
FIG. 2A illustrates an example of a workspace configuration, according to one or more embodiments.

Turning now to FIG. 2A, an example of a workspace configuration is illustrated, according to one or more embodiments. As shown, a workspace configuration 210A may include displays 220A-220C. In one or more embodiments, workspace configuration 210A may include an IHS 110A. In one or more embodiments, displays 220A-220C may be coupled to IHS 110A. In one example, one or more of displays 220A-220C may be coupled to IHS 110A in a wireless fashion. In another example, one or more of displays 220A-220C may be coupled to IHS 110A in a wired fashion. In one or more embodiments, displays 220A-220C may be at respective physical locations. In one example, display 220A may be at a first physical location. In a second example, display 220B may be at a second physical location, different from the first physical location. In another example, display 220C may be at a third physical location, different from the first physical location and different from the second physical location.

In one or more embodiments, a graphical user interface (GUI) associated with an application may be displayed via a display area of a display. For example, the GUI associated with the application may include one or more windows. In one or more embodiments, a display may include a screen that produces light emissions. In one or more embodiments, a display may include a projector that produces light emissions.

As illustrated, display 220A may include display areas 230A and 230B. In one example, display areas 230A and 230B may display windows of a single application. For instance, display areas 230A and 230B may display two windows of application (APP) 164. In another example, display areas 230A and 230B may display windows of two different applications. In one instance, display area 230A may display a window of APP 164. In another instance, display area 230B may display a window of APP 165. Although not specifically illustrated, display 220A may include a single display area, according to one or more embodiments.

As shown, display 220B may include display area 230C. For example, display area 230C may display a window of an application. In one instance, display area 230C may display a window of APP 164. In a second instance, display area 230C may display a window of APP 165. In another instance, display area 230C may display a window of APP 166. Although not specifically illustrated, display 220B may include multiple display areas, according to one or more embodiments.

As illustrated, display 220C may include display areas 230D-230F. In one example, display areas 230D-230F may display windows of a single application. In one instance, display areas 230D-230F may display three windows of APP 164. In a second instance, display areas 230D-230F may display three windows of APP 165. In a third instance, display areas 230D-230F may display three windows of APP 166. In another instance, display areas 230D-230F may display three windows of APP 167. In a second example, display areas 230D-230F may display windows of three different applications. In one instance, display area 230D may display a window of APP 164. In a second instance, display area 230E may display a window of APP 165. In a third instance, display area 230F may display a window of APP 166. In a fourth instance, display area 230F may display a window of APP 167. In another instance, display area 230F may display a window of APP 168. In another example, two of display areas 230D-230F may display windows of a first application, and the other of display areas 230D-230F may display windows of a second application, different from the first application. In one instance, display areas 230D and 230E may display windows of APP 164, and display area 230F may display a window of APP 165. In a second instance, display areas 230D and 230E may display windows of APP 164, and display area 230F may display a window of APP 167. In another instance, display areas 230D and 230E may display windows of APP 167, and display area 230F may display a window of APP 168. Although not specifically illustrated, display 220C may include a single display area, according to one or more embodiments.

As shown, displays 220A-220C may lay on a table 240. In one or more embodiments, table 240 may include a desk. As illustrated, IHS 110A may lay on table 240. In one or more embodiments, workspace configuration 210A may include table 240. In one or more embodiments, workspace configuration 210A may not include table 240. In one or more embodiments, a workspace may include multiple display areas displayed via one or more displays of a workspace configuration. For example, a workspace may include display areas 230A-230F displayed via displays 220A-220C of workspace configuration 210A.

Figure 2B:
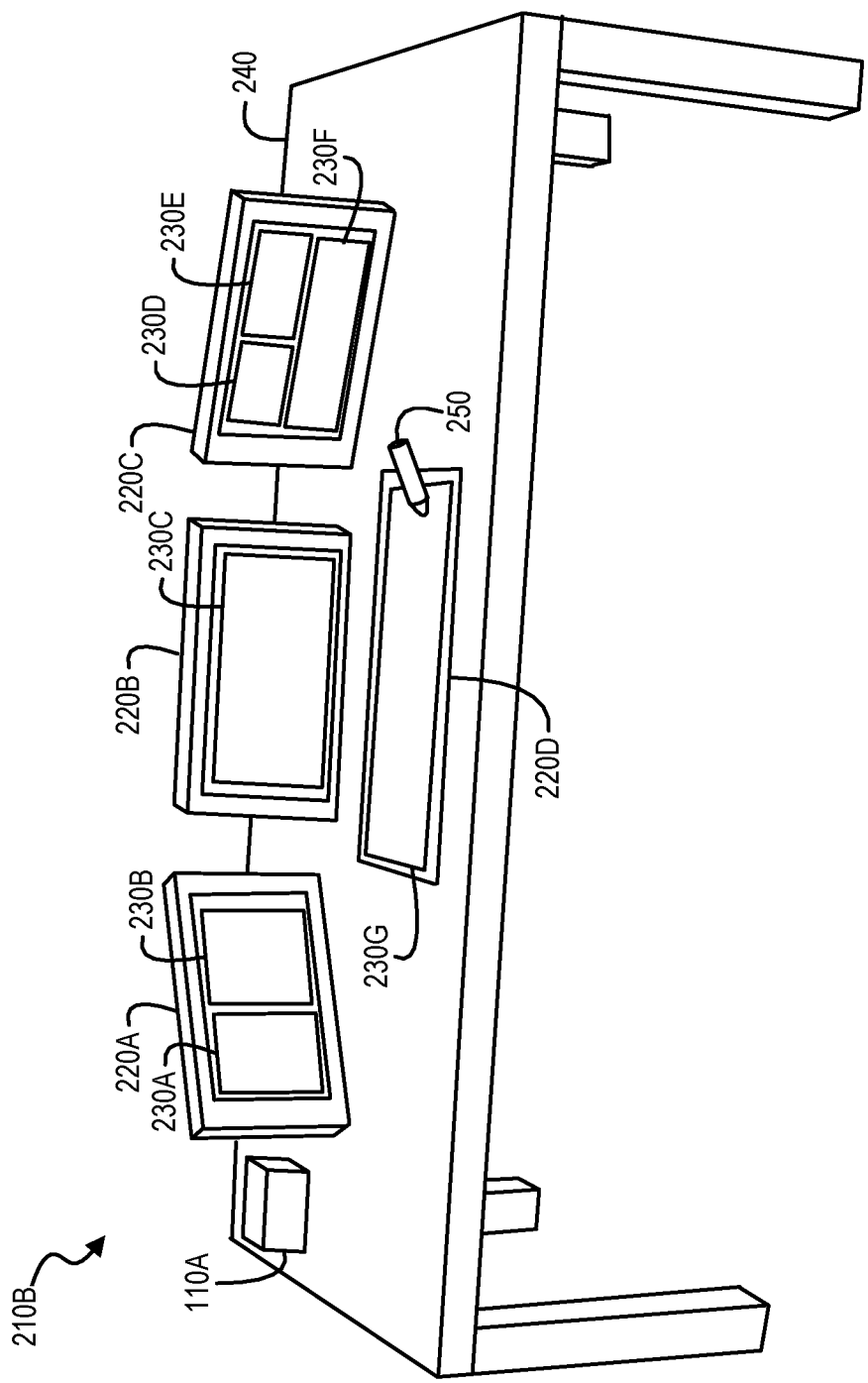
FIG. 2B illustrates a second example of a workspace configuration, according to one or more embodiments.

Turning now to FIG. 2B, a second example of a workspace configuration is illustrated, according to one or more embodiments. As shown, a workspace configuration 210B may include IHS 110A and displays 220A-220D. In one or more embodiments, display 220D may be integrated in table 240. For example, display 220D may be embedded in table 240. In one or more embodiments, display 220D may lay on table 240. In one or more embodiments, display 220D may be included by a portable information handling system (not specifically illustrated). For example, the portable information handling system may be different from IHS 110A. In one or more embodiments, workspace configuration 210B may include a stylus 250.

As illustrated, display 220D may include a display area 230G. For example, display area 230D may display a window of an application. For instance, display area 230D may display a window of one of APPs 164-168. Although not specifically illustrated, display 220D may include multiple display areas, according to one or more embodiments. In one or more embodiments, a workspace may include multiple display areas displayed via one or more displays of a workspace configuration. For example, a workspace may include display areas 230A-230G displayed via displays 220A-220D of workspace configuration 210B.

Figure 2C:
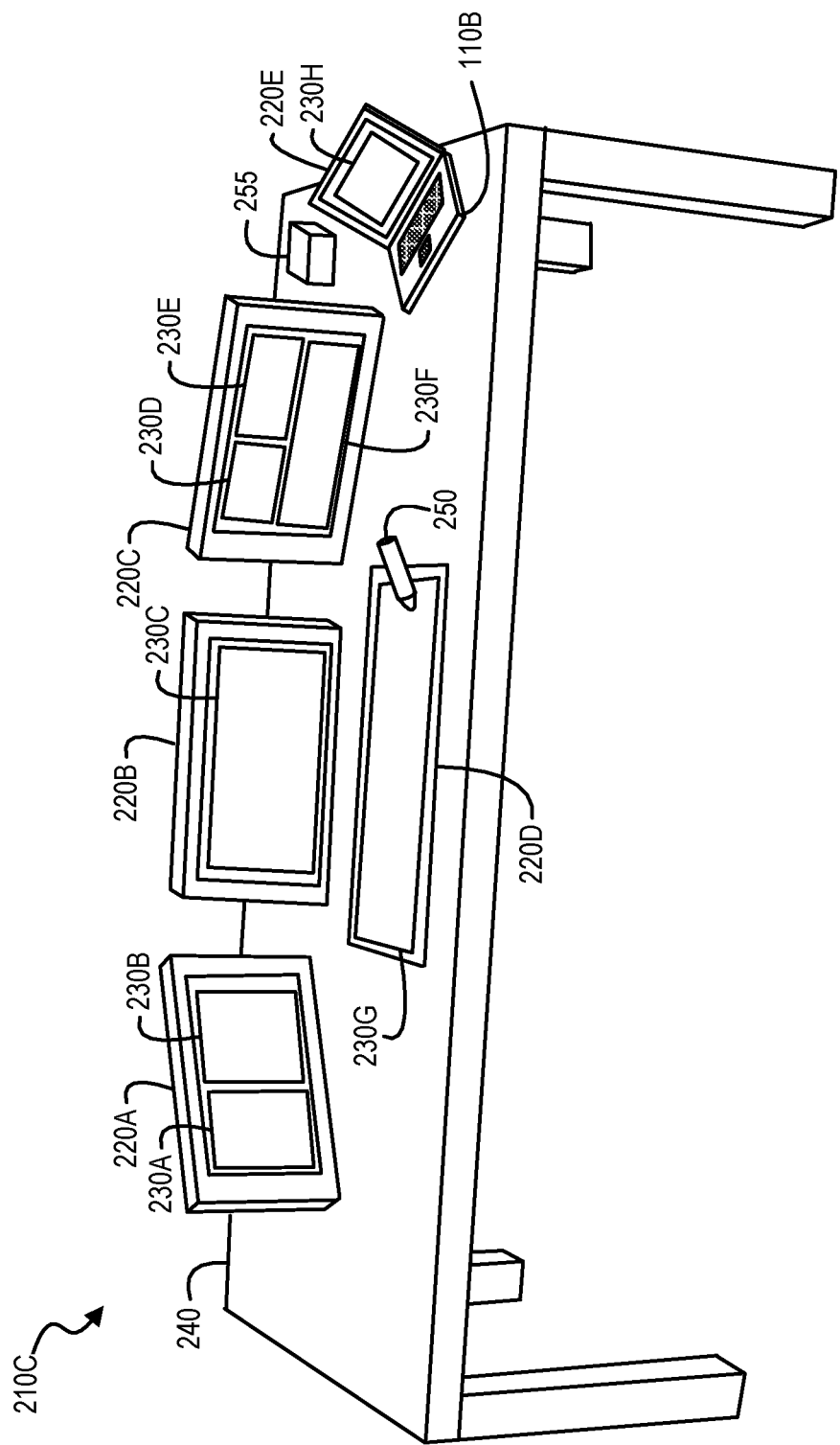
FIG. 2C illustrates a third example of a workspace configuration, according to one or more embodiments.

Turning now to FIG. 2C, a third example of a workspace configuration is illustrated, according to one or more embodiments. As shown, a workspace configuration 210C may include an IHS 110B and displays 220A-220D. In one or more embodiments, IHS 110B may be a portable information handling system (e.g., a laptop information handling system, a tablet information handling system, etc.). In one or more embodiments, IHS 110B may lay on table 240. In one or more embodiments, IHS 110B may be coupled to a docking station 255. In one example, IHS 110B may be coupled to docking station 255 in a wired fashion. In another example, IHS 110B may be coupled to docking station 255 in a wireless fashion. In one or more embodiments, one or more of displays 220A-220D may be coupled to docking station 255. In one example, one or more of displays 220A-220D may be coupled to docking station 255 in a wired fashion. In another example, one or more of displays 220A-220D may be coupled to docking station 255 in a wireless fashion. In one or more embodiments, workspace configuration 210C may include docking station 255. In one or more embodiments, docking station 255 may include one or more structures and/or one or more functionalities as those described with reference to IHS 110. In one or more embodiments, docking station 255 may implement at least a portion of one or more systems, one or more flowcharts, one or more methods, and/or one or more processes described herein.

As illustrated, IHS 110B may include a display 220E. As shown, display 220E may include a display area 230H. In one or more embodiments, workspace configuration 210C may include display 220E. For example, display area 230H may display a window of an application. For instance, display area 230D may display a window of one of APPs 164-168. Although not specifically illustrated, display 220E may include multiple display areas, according to one or more embodiments. In one or more embodiments, workspace configuration 210C may include stylus 250. In one or more embodiments, a workspace may include multiple display areas displayed via one or more displays of a workspace configuration. For example, a workspace may include display areas 230A-230H displayed via displays 220A-220E of workspace configuration 210C.

Figure 2D:
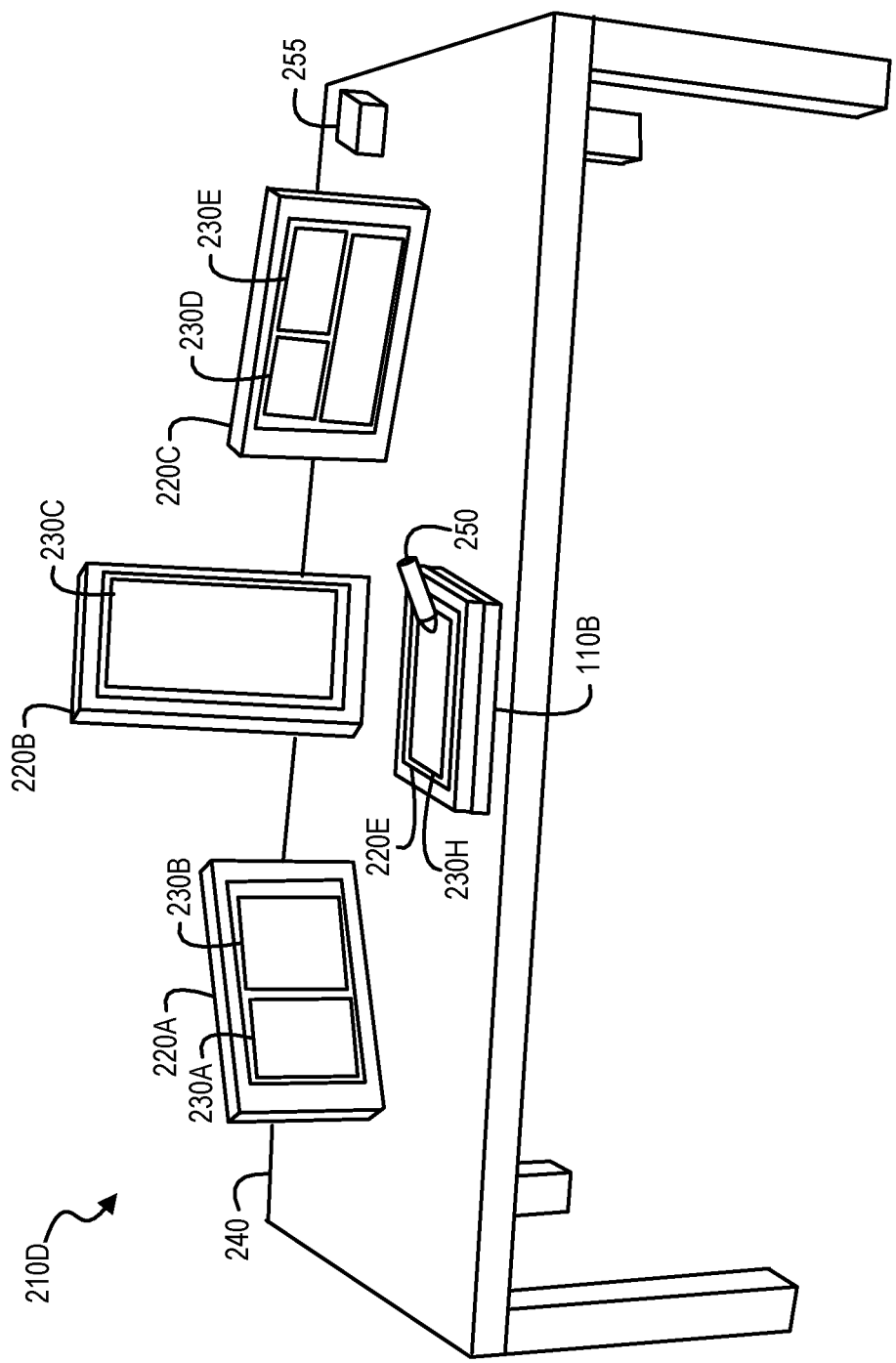
FIG. 2D illustrates another example of a workspace configuration, according to one or more embodiments.

Turning now to FIG. 2D, another example of a workspace configuration is illustrated, according to one or more embodiments. As shown, a workspace configuration 210D may include IHS 110B and displays 220A-220C and 220E. As illustrated, IHS 110B may be configured to hinge or to swing into a tablet information handling system. Although not specifically illustrated, display 220E may include multiple display areas, according to one or more embodiments. In one or more embodiments, a workspace may include multiple display areas displayed via one or more displays of a workspace configuration. For example, a workspace may include display areas 230A-230F and 230H displayed via displays 220A-220C and 220E of workspace configuration 210D. As illustrated, display 220B may be in a portrait posture. As shown, each of displays 220A and 220C may be in a landscape posture. In one or more embodiments, workspace configuration 210D may include docking station 255.

Figure 2E:
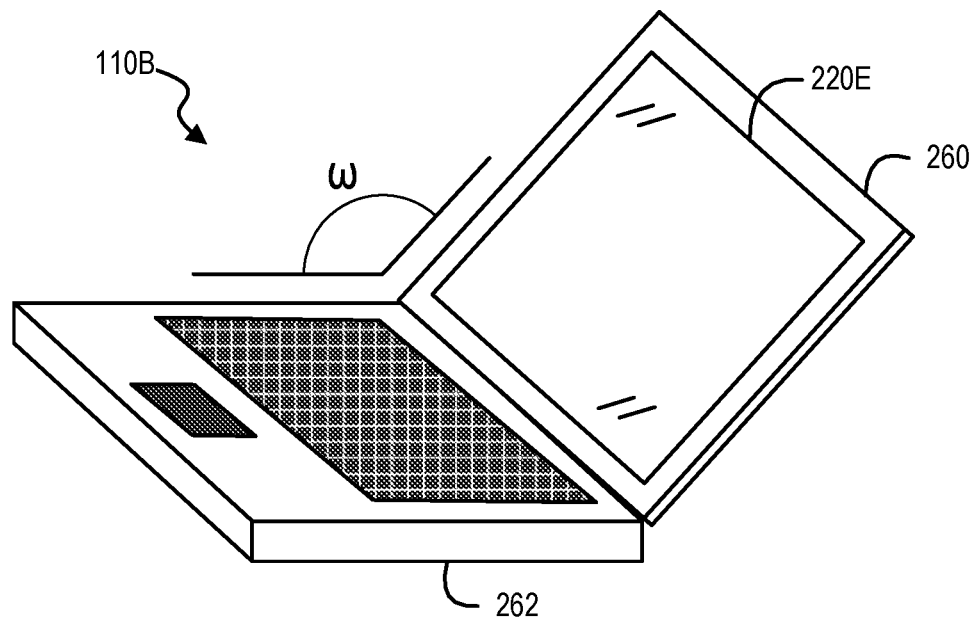
FIG. 2E illustrates a second example of an information handling system, according to one or more embodiments.

Turning now to FIG. 2E, a second example of an information handling system is illustrated, according to one or more embodiments. As shown, IHS 110B may include a lid 260. As illustrated, may include a chassis 262. As shown, lid 260 may be at an angle ω to chassis 262. For example, lid 260 may be coupled to chassis 262 via one or more hinges. For instance, angle ω may vary. In one or more embodiments, a posture of IHS 110B may include lid 260 at an angle ω to chassis 262.

Figure 2F:
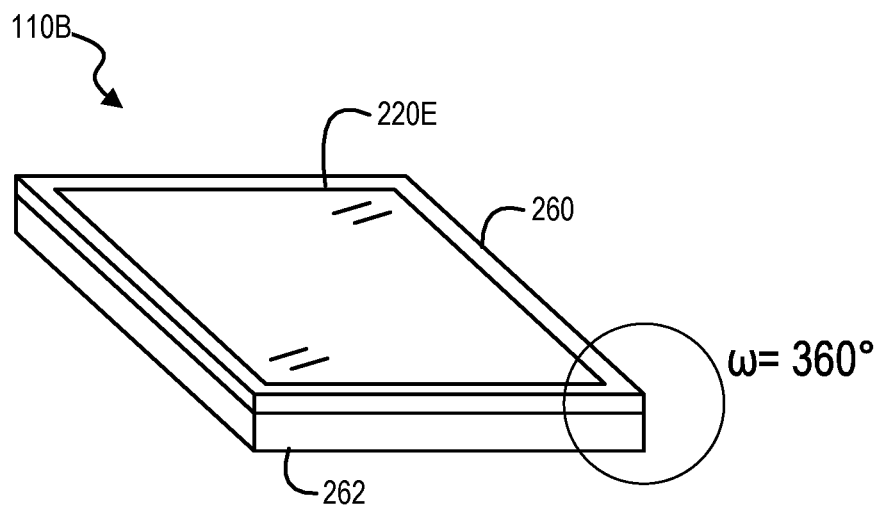
FIG. 2F illustrates a third example of an information handling system, according to one or more embodiments.

Turning now to FIG. 2F, a third example of an information handling system is illustrated, according to one or more embodiments. As shown, IHS 110B may be configured to hinge or to swing into a tablet information handling system. For example, ω may be 360°. In one instance, a posture of IHS 110B may include a tablet information handling system. In another instance, a posture of IHS 110B may include a 360° information handling system.

Figure 2G:
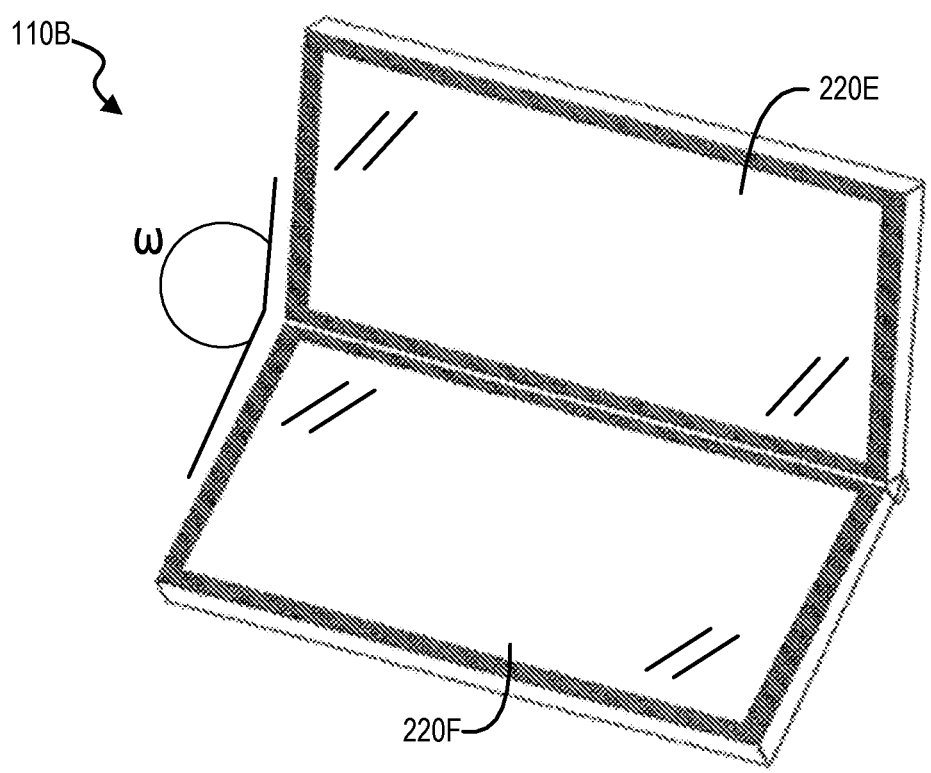
FIG. 2G illustrates a fourth example of an information handling system, according to one or more embodiments.

Turning now to FIG. 2G, a fourth example of an information handling system is illustrated, according to one or more embodiments. As shown, IHS 110B may include two displays 220E and 220F. As illustrated, display 220E may be at an angle ω to display 220F. For example, display 220E may be coupled to display 220F via one or more hinges. For instance, angle ω may vary. In one or more embodiments, a posture of IHS 110B may include display 220E at an angle ω to display 220F. In one or more embodiments, display 220E may be rotated such that ω may be 360°. For example, display 220E may considered a lid 260 and display 220F may considered a chassis 262, as illustrated in FIG. 2F, where ω may be 360°.

Figure 2H:
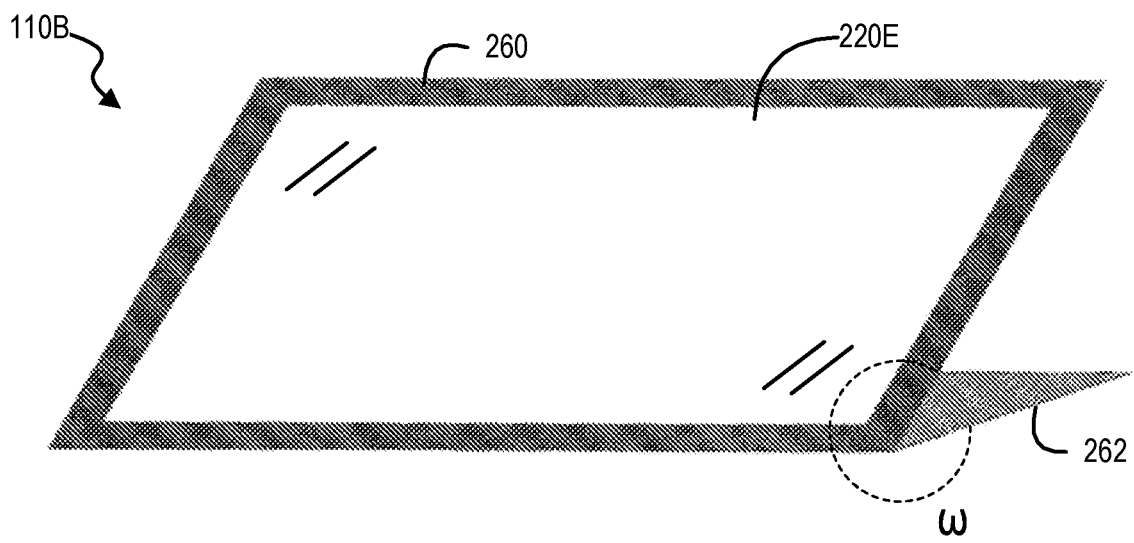
FIG. 2H illustrates another example of an information handling system, according to one or more embodiments.

Turning now to FIG. 2H, another example of an information handling system is illustrated, according to one or more embodiments. As shown, lid 260 may be at an angle ω to chassis 262. For example, lid 260 may be coupled to chassis 262 via one or more hinges. For instance, angle ω may vary. In one or more embodiments, a posture of IHS 110B may include lid 260 at an angle ω to chassis 262.

Figure 3:
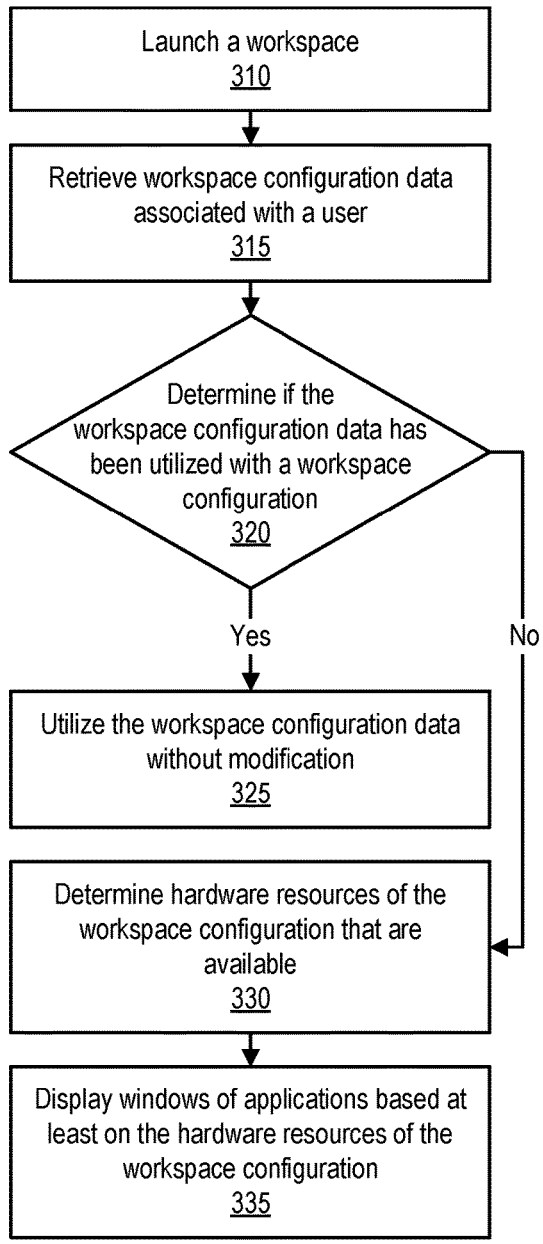
FIG. 3 illustrates an example of a method of operating a workspace configuration, according to one or more embodiments.

Turning now to FIG. 3, an example of a method of operating a workspace configuration is illustrated, according to one or more embodiments. At 310, a workspace may be launched. In one or more embodiments, launching a workspace may include a user logging into an information handling system. For example, the user may log into IHS 110. In one or more embodiments, launching a workspace may be performed in response to a user logging into the information handling system. In one or more embodiments, launching a workspace may include an information handling system coupling to a workspace configuration. In one example, IHS 110B may couple to displays 220A-220D. For instance, the workspace may be launched into workspace configuration 210C. In another example, IHS 110B may couple to docking station 255. For instance, launching a workspace may be performed in response to coupling an information handling system to a docking station.

At 315, workspace configuration data associated with a user may be retrieved. For example, IHS 110 may retrieve the workspace configuration data associated with a user. In one instance, the user may be have logged into IHS 110. In another instance, IHS 110 may be been coupled to docking station 255. At 320, it may be determined if the workspace configuration data has been utilized with a workspace configuration. For example, it may be determined if the workspace configuration data has been utilized with a workspace configuration 210.

If the workspace configuration data has been utilized with the workspace configuration, the workspace configuration data may be utilized without modification, at 325. If the workspace configuration data has not been utilized with the workspace configuration, available hardware resources of the workspace configuration may be determined, at 330. In one or more embodiments, determining available hardware resources of the workspace configuration may include an operating system service providing one or more capabilities of each piece of hardware of the workspace configuration associated with user interaction. For example, determining available hardware resources of the workspace configuration may include querying the operating system. The operating system may provide a data structure or a pointer to a data structure that includes information associated with one or more capabilities of each piece of hardware of the workspace configuration associated with user interaction. For instance, determining available hardware resources of the workspace configuration may include receiving the data structure or the pointer to the data structure that includes information associated with one or more capabilities of each piece of hardware of the workspace configuration associated with user interaction.

In one or more embodiments, determining available hardware resources of the workspace configuration may include determining a number of displays that are available. In one example, determining available hardware resources of workspace configuration 210A may include determining that three displays that are available. In a second example, determining available hardware resources of workspace configuration 210B may include determining that four displays that are available. In a third example, determining available hardware resources of workspace configuration 210C may include determining that five displays that are available. In another example, determining available hardware resources of workspace configuration 210D may include determining that four displays that are available.

In one or more embodiments, a display 220 may be identified via Extended Display Identification Data (EDID). For example, the EDID may include information associated with a display 220 to describe capabilities of display 220. In one instance, display 220 may provide EDID to a video source (e.g., a graphics card, a docking station, an information handling system, etc.). In another instance, one or more of a graphics card, a docking station, and an information handling system, among others, may receive the EDID. In one or more embodiments, the EDID may include one or more of a manufacturer name, a serial number, a product type, a filter type, timings supported by display 220, a display size, luminance data, and a pixel mapping data, among others. For example, the EDID may be formatted and/or stored via a data structure. In one or more embodiments, a format of the EDID may be defined by a standard published by the Video Electronics Standards Association (VESA).

In one or more embodiments, determining available hardware resources of the workspace configuration may include determining a resolution of each of the displays that are available. In one example, it may be determined that a resolution of display 220A is "1080p" (e.g., 1920×1080 pixels). In another example, it may be determined that a resolution of display 220B is "4K". In one instance, a "4K" resolution may be 3840×2160 pixels. In another instance, a "4K" resolution may be 4096×2160 pixels. In one or more embodiments, determining a resolution a display may include determining actual horizontal and vertical pixel ranges of a display.

In one or more embodiments, determining available hardware resources of the workspace configuration may include determining if a display supports touch input. In one example, it may be determined that display 220A does not support touch input. In a second example, it may be determined that display 220D does support touch input. In another example, it may be determined that display 220E does support touch input.

In one or more embodiments, determining available hardware resources of the workspace configuration may include determining what peripheral devices are included in the workspace configuration. In one example, it may be determined that stylus 250 is included in workspace configuration 210C. In a second example, it may be determined that stylus 250 is included in workspace configuration 210D. In a third example, it may be determined that a touchpad is included in workspace configuration 210C. In another example, it may be determined that a touchpad is not included in workspace configuration 210D.

At 335, windows of applications may be displayed based at least on the hardware resources of the workspace configuration. For example, the windows of the applications may be displayed via display areas 230 of workspace configuration 210.

In one or more embodiments, displaying the windows of the applications may include positioning a window of the windows of the applications on a display 220. In one or more embodiments, displaying the windows of the applications may include scaling a window of the windows of the applications on a display 220. In one example, the window of the windows of the applications may be scaled down. For instance, the window of the windows may have been previously displayed via a "4K" resolution, and the window of the windows may be scaled down for display via a "1080p" resolution. In another example, the window of the windows of the applications may be scaled up. For instance, the window of the windows may have been previously displayed via a "1080p" resolution, and the window of the windows may be scaled up for display via a "4K" resolution. In one or more embodiments, displaying the windows of the applications may include scaling a window of the windows of the applications on a display 220 by a ratio. For example, the ratio may include an aspect ratio. For instance, an aspect ratio may include 5:4, 4:3, 16:10, or 16:9, among others. In one or more embodiments, the workspace configuration data may be modified to display windows of applications based at least on the hardware resources of the workspace configuration.

In one or more embodiments, an application may be tagged. For example, if a user utilizes a stylus with an application, the application may be tagged with information that indicates that the application is utilized with a stylus. For instance, the workspace configuration data may include information that indicates that the application is utilized with a stylus. As an example, a window of the application may be displayed via display 220D based at least on the information that indicates that the application is utilized with a stylus. As another example, a window of the application may be displayed via display 220E based at least on the information that indicates that the application is utilized with a stylus. For instance, when a posture of IHS 110B is in a "tablet posture" or a "360° posture" as illustrated in FIG. 2D, a window of the application may be displayed via display 220E based at least on the information that indicates that the application is utilized with a stylus.

Figure 4A:
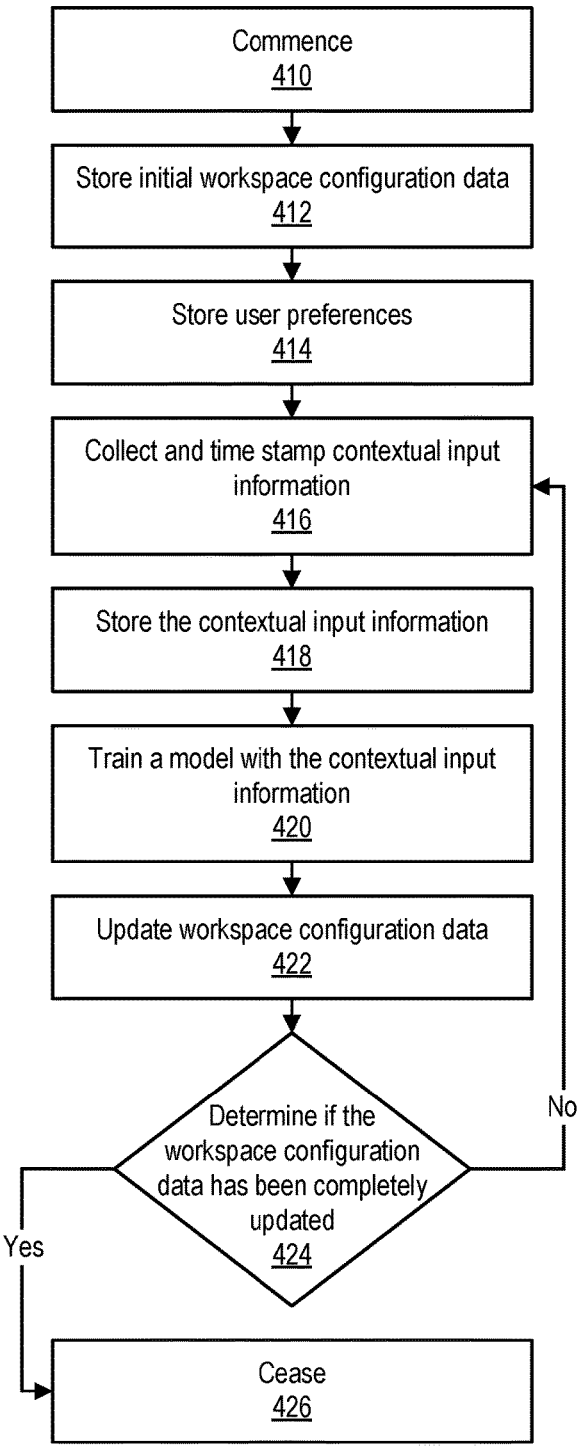
FIG. 4A illustrates a second example of operating a workspace configuration, according to one or more embodiments.

Turning now to FIG. 4A, a second example of operating a workspace configuration is illustrated, according to one or more embodiments. At 410, the method may commence. In one example, the method may commence via an initial boot up of an information handling system with a workspace configuration. In a second example, the method may commence via an out of box experience (OOBE) with a workspace configuration. For instance, the OOBE may include booting an information handling system with a workspace configuration for a first time. In another example, the method may commence via a user initiated training mode with a workspace configuration.

At 412, initial workspace configuration data may be stored. In one or more embodiments, the initial workspace configuration data may be populated by default configuration information. In one or more embodiments, the initial workspace configuration data may be populated by a default configuration policy. In one or more embodiments, the initial workspace configuration data may be stored after the workspace configuration data is populated via default configuration information and/or populated via a default configuration policy. At 414, user preferences may be stored. In one or more embodiments, the user preferences may include one or more identifications of respective one or more applications, one or more display settings, and/or one or more constraints, among others.

At 416, contextual input information may be collected and time stamped. In one example, the contextual input information may include a physical location. In one instance, the physical location may be indoors. In another instance, the physical location may be outdoors. In a second example, the contextual input information may include a number of displays of a workspace configuration. In a third example, the contextual input information may include information associated with a display. In one instance, the information associated with a display may include a resolution setting of the display. In a second instance, the information associated with a display may include dimensions of the display. In a third instance, the information associated with a display may include information that indicates that the display is internal to an information handling system or indicates that the display is external to an information handling system.

In a forth example, the contextual input information may include information that indicates a hinge angle. For instance, the hinge angle may be or include angle ω, illustrated in FIGS. 2E-2H. In a fifth example, the contextual input information may include information that indicates a posture. In one instance, the posture may include a portrait posture. In a second instance, the posture may include a landscape posture. In another instance, the posture may include "tablet posture" or a "360° posture". In a sixth example, the contextual input information may include information that may identify one or more applications with one or more open windows.

In a seventh example, the contextual input information may include information that indicates one or more positions of one or more windows. For instance, information that indicates a position of a window may include a horizontal offset and a vertical offset. A horizontal offset or a vertical offset may be expressed in pixels. In an eighth example, the contextual input information may include information that indicates an application. In one instance, an application that has "focus" may be an application that receives user input. In another instance, an application that has "focus" may be an application that has a window that is on top of any other window on a display. In a ninth example, the contextual input information may include information that indicates one or more services and/or one or more processes, among others.

In a tenth example, the contextual input information may include information that indicates a time of day. In an eleventh example, the contextual input information may include information that indicates operating system settings. In a twelfth example, the contextual input information may include information that indicates an ambient light measurement. For instance, the workspace configuration may include a light sensor that may measure one or more amounts of light and provide digital data that represents the one or more amounts of light. In one or more embodiments, IHS 110 may include a light sensor that may measure one or more amounts of light and provide digital data that represents the one or more amounts of light. For instance, processor 120 may receive the digital data that represents the one or more amounts of light.

At 418, the contextual input information may be stored. For example, the contextual input information may be stored via a non-volatile memory medium. At 420, a model may be trained with the contextual input information. For example, the model may be a model associated with an artificial intelligence. In one instance, the model may be a model associated with a machine learning process. In another instance, the model may be a model associated with a neural network. In one or more embodiments, training the model associated with an artificial intelligence may include training the model associated with the artificial intelligence via supervised learning. In one or more embodiments, training the model associated with an artificial intelligence may include training the model associated with the artificial intelligence via unsupervised learning.

At 422, the workspace configuration data may be updated. For example, the workspace configuration data may be updated based at least on the contextual input information. At 424, it may be determined if the workspace configuration data has been completely updated. If the workspace configuration data has been completely updated, the method may cease, at 426. If the workspace configuration data has not been completely updated, the method may proceed to 416, according to one or more embodiments.

Figure 4B:
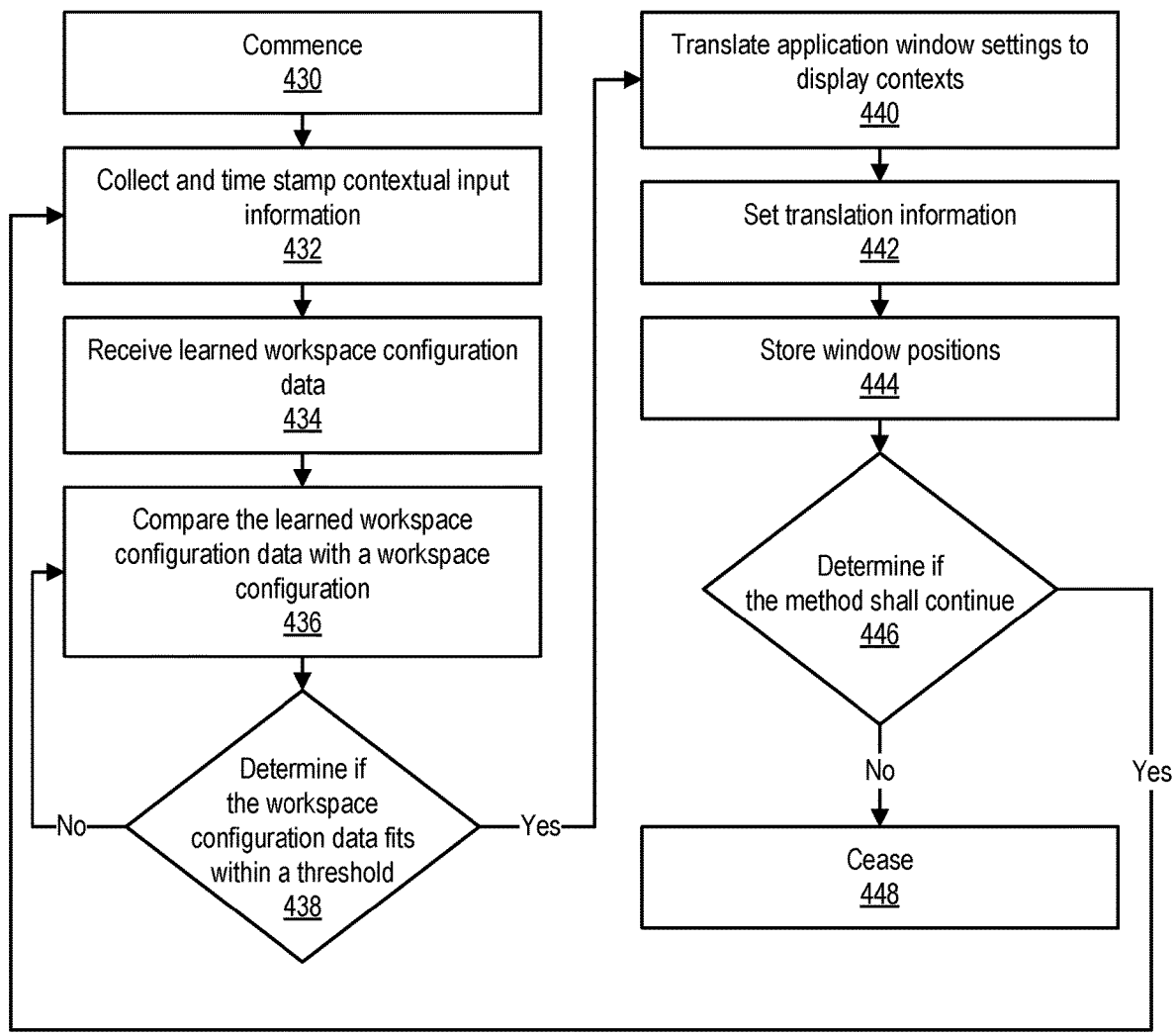
FIG. 4B illustrates a third example of operating a workspace configuration, according to one or more embodiments.

Turning now to FIG. 4B, a third example of operating a workspace configuration is illustrated, according to one or more embodiments. At 430, the method may commence. At 432, contextual input information may be collected and time stamped. In one example, the contextual input information may include a physical location. In one instance, the physical location may be indoors. In another instance, the physical location may be outdoors. In a second example, the contextual input information may include a number of displays of a workspace configuration. In a third example, the contextual input information may include information associated with a display. In one instance, the information associated with a display may include a resolution setting of the display. In a second instance, the information associated with a display may include dimensions of the display. In a third instance, the information associated with a display may include information that indicates that the display is internal to an information handling system or indicates that the display is external to an information handling system.

In a forth example, the contextual input information may include information that indicates a hinge angle. For instance, the hinge angle may be or include angle $\omega$, illustrated in FIGS. 2E-2H. In a fifth example, the contextual input information may include information that indicates a posture. In one instance, the posture may include a portrait posture. In a second instance, the posture may include a landscape posture. In another instance, the posture may include "tablet posture" or a "360° posture". In a sixth example, the contextual input information may include information that may identify one or more applications with one or more open windows.

In a seventh example, the contextual input information may include information that indicates one or more positions of one or more windows. For instance, information that indicates a position of a window may include a horizontal offset and a vertical offset. A horizontal offset or a vertical offset may be expressed in pixels. In an eighth example, the contextual input information may include information that indicates an application. In one instance, an application that has "focus" may be an application that receives user input. In another instance, an application that has "focus" may be an application that has a window that is on top of any other window on a display. In a ninth example, the contextual input information may include information that indicates one or more services and/or one or more processes, among others.

In a tenth example, the contextual input information may include information that indicates a time of day. In an eleventh example, the contextual input information may include information that indicates operating system settings. In a twelfth example, the contextual input information may include information that indicates an ambient light measurement. For instance, the workspace configuration may include a light sensor that may measure one or more amounts of light and provide digital data that represents the one or more amounts of light.

At 434, learned workspace configuration data may be received. In one example, the learned workspace configuration data may be received from a non-volatile memory medium. In another example, the learned workspace configuration data may be received from a network. In one instance, the learned workspace configuration data may be received from an information handling system coupled to a network. In another instance, the learned workspace configuration data may be received from a non-volatile memory medium coupled to a network. In one or more embodiments, receiving the learned workspace configuration data may include retrieving the learned workspace configuration data. In one example, the learned workspace configuration data may be retrieved from a non-volatile memory medium. In another example, the learned workspace configuration data may be retrieved from a network. In one instance, the learned workspace configuration data may be retrieved from an information handling system coupled to a network. In another instance, the learned workspace configuration data may be retrieved from a non-volatile memory medium coupled to a network.

At 436, the learned workspace configuration data may be compared with a workspace configuration. In one or more embodiments, comparing the learned workspace configuration data with a workspace configuration may include comparing a number of displays indicated by the learned workspace configuration data with a number of displays of the workspace configuration. In one or more embodiments, comparing the learned workspace configuration data with a workspace configuration may include comparing a resolution of a display indicated by the learned workspace configuration data with a resolution of a display of the workspace configuration. In one or more embodiments, comparing the learned workspace configuration data with a workspace configuration may include determining if a display of the workspace configuration supports touch input. In one or more embodiments, comparing the learned workspace configuration data with a workspace configuration may include determining if a peripheral is present in the workspace configuration.

At 438, it may be determined if the workspace configuration data fits within a threshold. In one or more embodiments, determining if the workspace configuration data fits within a threshold may include determining if the windows associated with the workspace configuration data fit to the displays of the workspace configuration. In one or more embodiments, determining if the workspace configuration data fits within a threshold may include determining if the windows associated with the workspace configuration data can be translated to be utilized with the displays of the workspace configuration.

If the workspace configuration data does not fit within the threshold, the method may proceed to 436, according to one or more embodiments. If the workspace configuration data fits within the threshold, application window settings may be translated to application contexts, at 440. In one example, translating the application window settings to application contexts may include scaling up or scaling down one or more application window settings based on a resolution of a display of the workspace configuration. In another example, translating the application window settings to application contexts may include scaling up or altering an aspect ratio of application window settings based on an aspect ratio of a display of the workspace configuration.

At 442, translation information may be set. At 444, window positions may be stored. For example, window positions may be stored via a non-volatile memory medium. At 446, it may be determined if the method shall continue. If the method shall continue, the method may proceed to 432, according to one or more embodiments. If the method shall not continue, the method may cease, at 448.

Figure 5:
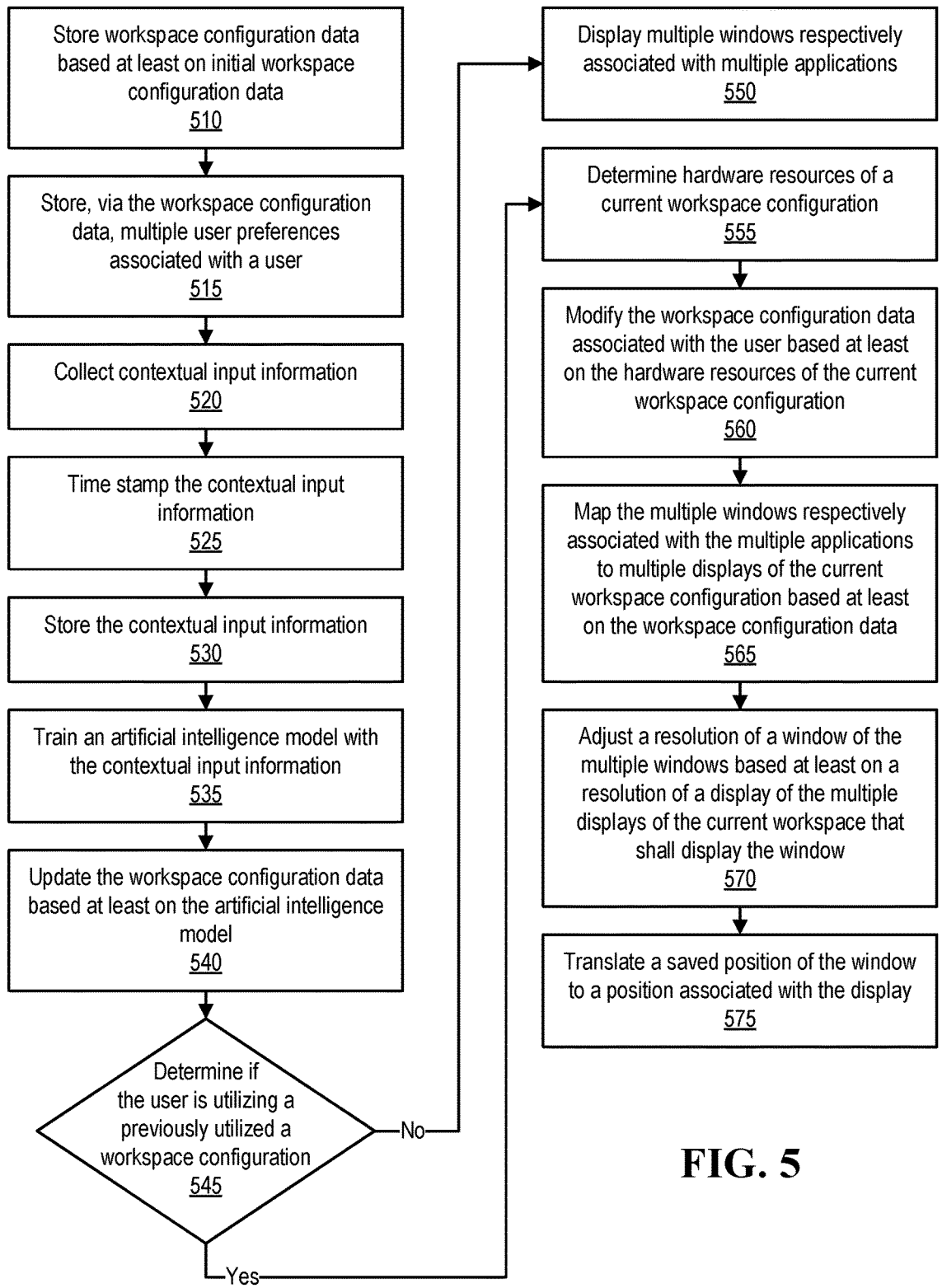
FIG. 5 illustrates another example of operating a workspace configuration, according to one or more embodiments.

Turning now to FIG. 5, another example of operating a workspace configuration is illustrated, according to one or more embodiments. At 510, workspace configuration data based at least on initial workspace configuration data may be stored. In one example, IHS 110 may store workspace configuration data based at least on initial workspace configuration data. In another example, docking station 255 may store workspace configuration data based at least on initial workspace configuration data. In one or more embodiments, storing workspace configuration data based at least on initial workspace configuration data may include storing the workspace configuration data based at least on the initial workspace configuration data via a network. For example, docking station 255 may store the workspace configuration data based at least on the initial workspace configuration data via a network. For instance, an information handling system coupled to the network may receive the workspace configuration data and may store the workspace configuration data.

At 515, multiple user preferences associated with a user may be stored via the workspace configuration data. In one example, IHS 110 may store, via the workspace configuration data, multiple user preferences associated with a user. In another example, docking station 255 may store, via the workspace configuration data, multiple user preferences associated with a user. In one or more embodiments, storing, via the workspace configuration data, multiple user preferences associated with a user may include storing, via the workspace configuration data, the multiple user preferences associated with the user via a network. For example, docking station 255 may store, via the workspace configuration data, the multiple user preferences associated with the user via a network. For instance, an information handling system coupled to the network may receive the multiple user preferences associated with the user and may store the multiple user preferences associated with the user via the workspace configuration data.

At 520, contextual input information may be collected. In one example, IHS 110 may collect contextual input information. In another example, docking station 255 may collect contextual input information. At 525, the contextual input information may be time stamped. In one example, IHS 110 may time stamp the contextual input information. In another example, docking station 255 may time stamp the contextual input information.

At 530, the contextual input information may be stored. In one example, IHS 110 may store the contextual input information. In one example, docking station 255 may store the contextual input information. In one or more embodiments, storing the contextual input information may include storing the contextual input information via a network. For instance, an information handling system coupled to the network may receive the contextual input information and may store the contextual input information.

At 535, an artificial intelligence model may be trained with the contextual input information. In one example, IHS 110 may train an artificial intelligence model with the contextual input information. In a second example, docking station 255 may train an artificial intelligence model with the contextual input information. In another example, a cloud-based computational solution may train an artificial intelligence model with the contextual input information.

At 540, the workspace configuration data may be updated based at least on the artificial intelligence model. In one example, IHS 110 may update the workspace configuration data based at least on the artificial intelligence model. In a second example, docking station 255 may update the workspace configuration data based at least on the artificial intelligence model. In another example, a cloud-based computational solution may update the workspace configuration data based at least on the artificial intelligence model.

At 545, it may be determined if the user is utilizing a previously utilized a workspace configuration. In one example, IHS 110 may determine if the user is utilizing a previously utilized a workspace configuration. In another example, docking station 255 may determine if the user is utilizing a previously utilized a workspace configuration.

If the user is utilizing the previously utilized workspace configuration, multiple windows respectively associated with multiple applications may be displayed, at 550. In one example, IHS 110 may display multiple windows respectively associated with multiple applications via multiple displays of the previously utilized workspace configuration. In another example, docking station 255 may display multiple windows respectively associated with multiple applications via multiple displays of the previously utilized workspace configuration.

If the user is not utilizing the previously utilized workspace configuration, hardware resources of a current workspace configuration may be determined, at 555. In one example, IHS 110 may determine hardware resources of a current workspace configuration. In another example, docking station 255 may determine hardware resources of a current workspace configuration.

At 560, the workspace configuration data associated with the user may be modified based at least on the hardware resources of the current workspace configuration. In one example, IHS 110 may modify the workspace configuration data associated with the user based at least on the hardware resources of the current workspace configuration. In another example, docking station 255 may modify the workspace configuration data associated with the user based at least on the hardware resources of the current workspace configuration.

At 565, the multiple windows respectively associated with the multiple applications may be mapped to multiple displays of the current workspace configuration based at least on the workspace configuration data. In one example, IHS 110 may map the multiple windows respectively associated with the multiple applications to multiple displays of the current workspace configuration based at least on the workspace configuration data. In another example, docking station 255 may map the multiple windows respectively associated with the multiple applications to multiple displays of the current workspace configuration based at least on the workspace configuration data.

At 570, a resolution of a window of the multiple windows may be adjusted based at least on a resolution of a display of the multiple displays of the current workspace that shall display the window. In one example, IHS 110 may adjust a resolution of a window of the multiple windows based at least on a resolution of a display of the multiple displays of the current workspace that shall display the window. In another example, docking station 255 may adjust a resolution of a window of the multiple windows based at least on a resolution of a display of the multiple displays of the current workspace that shall display the window.

At 575, a saved position of the window may be translated to a position associated with the display. In one example, IHS 110 may translate a saved position of the window to a position associated with the display. In another example, docking station 255 may translate a saved position of the window to a position associated with the display.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, one or more systems, one or more methods, and/or one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A system, comprising:
   at least one processor; and
   a memory medium, coupled to the at least one processor, that stores instructions executable by the at least one processor, which when executed by the at least one processor, cause the system to:
     store workspace configuration data, associated with a user, based at least on initial workspace configuration data;
     store, via the workspace configuration data, a plurality of user preferences associated with the user;
     collect contextual input information;
     time stamp the contextual input information;
     store the contextual input information;
     train an artificial intelligence model with the contextual input information;
     update the workspace configuration data based at least on the artificial intelligence model;
     determine if the user is utilizing a previously utilized workspace configuration;
     if the user is utilizing the previously utilized workspace configuration, display a plurality of windows respectively associated with a plurality of applications as the plurality of windows were displayed via displays of the previously utilized workspace configuration; and
     if the user is not utilizing the previously utilized workspace configuration:
       determine hardware resources of a current workspace configuration;
       modify the workspace configuration data associated with the user based at least on the hardware resources of the current workspace configuration;
       determine that a display of the plurality of displays of the current workspace is configured to receive user input via a stylus;
       determine that a window of the plurality of windows is associated with an application of the plurality of applications that has been associated with the user input via the stylus and that the application has been tagged for utilization with the stylus;
       map the plurality of windows respectively associated with the plurality of applications to a plurality of displays of the current workspace configuration based at least on the workspace configuration data and the window to the display based at least on determining that the display is configured to receive the user input via the stylus;
       adjust a resolution of the window based at least on a resolution of the display of the plurality of displays of the current workspace that shall display the window; and
       translate a saved position of the window to a position associated with the display.

2. The system of claim 1, wherein, to determine the hardware resources of the current workspace configuration, the instructions further cause the system to receive Extended Display Identification Data (EDID) that describe capabilities of the display of the plurality of displays of the current workspace that shall display the window.

3. The system of claim 2, wherein the EDID includes one or more of a manufacturer name, a serial number, a product type, a filter type, timings supported by the display, a size of the display, luminance data, and pixel mapping data.

4. The system of claim 3,
wherein the EDID includes the size of the display and the pixel mapping data; and
wherein, to adjust the resolution of the window, the instructions further cause the system to adjust the resolution of the window based at least on the size of the display and the pixel mapping data.

5. The system of claim 1,
wherein the window is associated with a first aspect ratio; and
wherein, to adjust the resolution of the window of the plurality of windows, the instructions further cause the system to adjust the resolution of the window of the plurality of windows further based at least on a second aspect ratio, different from the first aspect ratio, associated with the display.

6. A method, comprising:
storing workspace configuration data based at least on initial workspace configuration data;
storing, via the workspace configuration data, a plurality of user preferences associated with a user;
collecting contextual input information;
time stamping the contextual input information;
storing the contextual input information;
training an artificial intelligence model with the contextual input information;
updating the workspace configuration data based at least on the artificial intelligence model;
determining if the user is utilizing a previously utilized workspace configuration;
if the user is utilizing the previously utilized workspace configuration, displaying a plurality of windows respectively associated with a plurality of applications as the plurality of windows were displayed via displays of the previously utilized workspace configuration; and
if the user is not utilizing the previously utilized workspace configuration:
  determining hardware resources of a current workspace configuration;
  modifying workspace configuration data associated with the user based at least on the hardware resources of the current workspace configuration;
  determining that a display of the plurality of displays of the current workspace is configured to receive user input via a stylus;
  determining that a window of the plurality of windows is associated with an application of the plurality of applications that has been associated with the user input via the stylus and that the application has been tagged for utilization with the stylus;
  mapping the plurality of windows respectively associated with the plurality of applications to a plurality of displays of the current workspace configuration based at least on the workspace configuration data and the window to the display based at least on determining that the display is configured to receive the user input via the stylus;
  adjusting a resolution of the window of the plurality of windows based at least on a resolution of the display of the plurality of displays of the current workspace that shall display the window; and
  translating a saved position of the window to a position associated with the display.

7. The method of claim 6, wherein the determining the hardware resources of the current workspace configuration includes receiving Extended Display Identification Data (EDID) that describe capabilities of the display of the plurality of displays of the current workspace that shall display the window.

8. The method of claim 7, wherein the EDID includes one or more of a manufacturer name, a serial number, a product type, a filter type, timings supported by the display, a size of the display, luminance data, and pixel mapping data.

9. The method of claim 8,
wherein the EDID includes the size of the display and the pixel mapping data; and
wherein the adjusting the resolution of the window is based at least on the size of the display and the pixel mapping data.

10. The method of claim 6,
wherein the window is associated with a first aspect ratio; and
wherein the adjusting the resolution of the window of the plurality of windows is further based at least on a second aspect ratio, different from the first aspect ratio, associated with the display.

11. A computer-readable non-transitory memory medium that includes instructions that, when executed by at least one processor of a system, cause the system to:
store workspace configuration data, associated with a user, based at least on initial workspace configuration data;
store, via the workspace configuration data, a plurality of user preferences associated with the user;
collect contextual input information;
time stamp the contextual input information;
store the contextual input information;
train an artificial intelligence model with the contextual input information;
update the workspace configuration data based at least on the artificial intelligence model;
determine if the user is utilizing a previously utilized workspace configuration;
if the user is utilizing the previously utilized workspace configuration, display a plurality of windows respectively associated with a plurality of applications as the plurality of windows were displayed via displays of the previously utilized workspace configuration; and
if the user is not utilizing the previously utilized workspace configuration:
  determine hardware resources of a current workspace configuration;
  modify the workspace configuration data associated with the user based at least on the hardware resources of the current workspace configuration;
  determine that a display of the plurality of displays of the current workspace is configured to receive user input via a stylus;
  determine that a window of the plurality of windows is associated with an application of the plurality of applications that has been associated with the user input via the stylus and that the application has been tagged for utilization with the stylus;

map the plurality of windows respectively associated with the plurality of applications to a plurality of displays of the current workspace configuration based at least on the workspace configuration data and the window to the display based at least on determining that the display is configured to receive the user input via the stylus;

adjust a resolution of the window of the plurality of windows based at least on a resolution of the display of the plurality of displays of the current workspace that shall display the window; and translate a saved position of the window to a position associated with the display.

12. The computer-readable non-transitory memory medium of claim 11, wherein, to determine the hardware resources of the current workspace configuration, the instructions further cause the system to receive Extended Display Identification Data (EDID) that describe capabilities of the display of the plurality of displays of the current workspace that shall display the window.

13. The computer-readable non-transitory memory medium of claim 12, wherein the EDID includes one or more of a manufacturer name, a serial number, a product type, a filter type, timings supported by the display, a size of the display, luminance data, and pixel mapping data.

14. The computer-readable non-transitory memory medium of claim 13, wherein the EDID includes the size of the display and the pixel mapping data; and wherein, to adjust the resolution of the window, the instructions further cause the system to adjust the resolution of the window based at least on the size of the display and the pixel mapping data.

* * * * *